US010326544B2

(12) United States Patent
Buckley et al.

(10) Patent No.: US 10,326,544 B2
(45) Date of Patent: Jun. 18, 2019

(54) RECEIVING PUBLIC WARNING SYSTEM DATA

(71) Applicant: BlackBerry Limited, Waterloo (CA)

(72) Inventors: Adrian Buckley, Tracy, CA (US); Michael Eoin Buckley, Grayslake, IL (US); Shu-Lin Chen, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/862,143

(22) Filed: Sep. 22, 2015

(65) Prior Publication Data

US 2017/0086047 A1     Mar. 23, 2017

(51) Int. Cl.
| | |
|---|---|
| *H04Q 7/10* | (2006.01) |
| *H04W 8/22* | (2009.01) |
| *H04W 60/02* | (2009.01) |
| *H04H 20/59* | (2008.01) |
| *G08B 25/01* | (2006.01) |
| *G08B 21/10* | (2006.01) |
| *H04L 12/18* | (2006.01) |
| *G08B 25/08* | (2006.01) |
| *H04W 4/90* | (2018.01) |

(52) U.S. Cl.
CPC .............. *H04H 20/59* (2013.01); *G08B 21/10* (2013.01); *G08B 25/016* (2013.01); *G08B 25/08* (2013.01); *H04L 12/189* (2013.01); *H04L 12/1895* (2013.01); *H04W 4/90* (2018.02)

(58) Field of Classification Search
CPC ... H04W 76/007; H04W 4/12; H04W 72/005; H04W 4/22; H04L 12/1863; H04L 12/189
USPC ............................................... 455/404.1, 466
See application file for complete search history.

(56) References Cited

U.S. PATENT DOCUMENTS

| | | | |
|---|---|---|---|
| 8,238,891 B1 | 8/2012 | Tam et al. | |
| 9,167,402 B2* | 10/2015 | Sammour | ............... H04W 4/22 |
| 2009/0130972 A1* | 5/2009 | Andersen | .............. H04W 8/245 455/3.01 |
| 2009/0233634 A1* | 9/2009 | Aghili | ................. H04W 76/007 455/466 |
| 2009/0253401 A1* | 10/2009 | Lee | ..................... H04W 76/007 455/404.1 |
| 2010/0124898 A1 | 5/2010 | Qu | |
| 2010/0138754 A1 | 6/2010 | Wilson et al. | |
| 2011/0045796 A1* | 2/2011 | Lee | ..................... H04L 12/1863 455/404.1 |
| 2011/0103308 A1 | 5/2011 | Lee | |
| 2011/0159837 A1 | 6/2011 | Daly | |

(Continued)

FOREIGN PATENT DOCUMENTS

| | | |
|---|---|---|
| WO | WO2009/053111 | 4/2009 |
| WO | 2014/072321 | 5/2014 |

(Continued)

OTHER PUBLICATIONS

International Search Report and Written Opinion of the International Searching Authority issued in International Application No. PCT/US2016/053079 dated Jan. 2, 2017; 9 pages.

(Continued)

*Primary Examiner* — Julio R Perez (74) *Attorney, Agent, or Firm* — Fish & Richardson P.C.

(57) ABSTRACT

A method for receiving public warning system (PWS) data includes receiving, at a user equipment (UE), a public warning system (PWS) message. The UE determines that the PWS message is a type 2 PWS message. The type 2 PWS message indicates that type 2 PWS data is delivered using a type 2 PWS data delivery mechanism. The type 2 PWS data is received using the type 2 PWS data delivery mechanism.

15 Claims, 6 Drawing Sheets

(56) References Cited

U.S. PATENT DOCUMENTS

| | | | |
|---|---|---|---|
| 2013/0074120 A1 | 3/2013 | Adimatyam | |
| 2013/0185561 A1* | 7/2013 | Brusilovsky | H04L 63/0823 |
| | | | 713/170 |
| 2014/0024332 A1* | 1/2014 | Droste | H04L 12/1895 |
| | | | 455/404.2 |
| 2014/0134970 A1* | 5/2014 | Pazos | H04L 65/4069 |
| | | | 455/404.1 |
| 2014/0179258 A1 | 6/2014 | Arzelier | |
| 2014/0273910 A1* | 9/2014 | Ballantyne | H04W 4/22 |
| | | | 455/404.1 |
| 2014/0286222 A1 | 9/2014 | Yu et al. | |
| 2014/0330743 A1 | 11/2014 | Ramakrishnan et al. | |
| 2014/0341059 A1* | 11/2014 | Jang | H04W 48/06 |
| | | | 370/252 |
| 2014/0369326 A1 | 12/2014 | Wang et al. | |
| 2014/0378085 A1 | 12/2014 | Jeong et al. | |
| 2015/0280845 A1* | 10/2015 | Ballakur | H04W 4/06 |
| | | | 455/3.01 |
| 2015/0372775 A1 | 12/2015 | Kwak | |
| 2017/0013433 A1* | 1/2017 | Lee | H04L 12/189 |
| 2017/0215047 A1 | 7/2017 | Lee | |

FOREIGN PATENT DOCUMENTS

| | | |
|---|---|---|
| WO | WO2015/137730 | 9/2015 |
| WO | 2016/043567 | 3/2016 |

OTHER PUBLICATIONS

International Search Report and Written Opinion of the International Searching Authority issued in International Application No. PCT/US2016/044691 dated Oct. 20, 2016; 15 pages.

"Third Generation Partnership Project; Technical Specification Group Services and System Aspects; Study on Multimedia Broadcast Supplement for Publish Warning system (MBSP) (Release 14)"; 3GPP TR 22.815 V14.0.0; vol. SA WG1, No. V14.0.0; Dec. 19, 2014; pp. 1-22.

Third Generation Partnership Project; Technical Specification Group Services and System Aspects; Public Warning System (PWS) Requirements (Release 11); 3GPP TS 22.268 V11.5.0; vol. SA WG1, No. V11.5.0; Dec. 14, 2012; pp. 1-15.

"Third Generation Partnership Project; Technical Specification Group Radio Access Network; Evolved Universal Terrestrial Radio Access (E-UTRA); Radio Resource Control (RRC); Protocol Specification (Release 11)"; 3GPP TS 36.331 V11.12.0, vol. RAN WG2, No. V11.12.0; Jun. 30, 2015, pp. 1-357.

Advisory Action issued in U.S. Appl. No. 14/812,413 dated Dec. 4, 2017; 3 pages.

Office Action issued in U.S. Appl. No. 14/812,413 dated Sep. 19, 2017; 19 pages.

Office Action issued in U.S. Appl. No. 14/812,413 dated May 9, 2018, 19 pages.

Interview Summary issued in U.S. Appl. No. 14/812,413 dated Oct. 11, 2018, 2 pages.

Advisory Action issued in U.S. Appl. No. 14/812,413 dated Nov. 7, 2018, 3 pages.

Interview summary issued in U.S. Appl. No. 14/812,413 dated Jul. 25, 2018, 3 pages.

United States Final Office Action issued in U.S. Appl. No. 14/812,413 dated Aug. 31, 2018, 11 pages.

Notice of Allowance issued in U.S. Appl. No. 14/812,413 dated Dec. 5, 2018, 8 pages.

Partial European Search Report pursuant to Rule 64 EPC issued in European Application No. 16849580.2 dated Feb. 27, 2019, 23 pages.

* cited by examiner

- *MBSFNAreaConfiguration*

The *MBSFNAreaConfiguration* message contains the MBMS control information applicable for an MBSFN area. E-UTRAN configures an MCCH for each MBSFN area i.e. the MCCH identifies the MBSFN area.

Signalling radio bearer: N/A

RLC-SAP: UM

Logical channel: MCCH

Direction: E_UTRAN to UE

MBSFNAreaConfiguration message

-- ASN1START

```
MBSFNAreaConfiguration-r9 ::=         SEQUENCE {
    commonSF-Alloc-r9                     CommonSF-AllocPatternList-r9,
    commonSF-AllocPeriod-r9               ENUMERATED {
                                              rf4, rf8, rf16, rf32, rf64, rf128, rf256},
    pmch-InfoList-r9                      PMCH-InfoList-r9,
    nonCriticalExtension                  MBSFNAreaConfiguration-v930-Ies   OPTIONAL
}

MBSFNAreaConfiguration-v930-Ies ::= SEQUENCE {
    lateNonCriticalExtension              OCTET STRING                       OPTIONAL,
    nonCriticalExtension                  MBSFNAreaConfiguration-v12xy-Ies   OPTIONAL
}

MBSFNAreaConfiguration-v12xy-Ies ::= SEQUENCE {
    pmch-InfoListExt-r12                  PMCH-InfoListExt-r12               OPTIONAL,
nonCriticalExtension                      SEQUENCE { }                       OPTIONAL
}

CommonSF-AllocPatternList-r9 ::=    SEQUENCE (SIZE (1..maxMBSFN-Allocations)) OF
MBSFN-SubframeConfig
```

-- ASN1STOP

FROM FIG. 6A

- PMCH-InfoList

The IE *PMCH-InfoList* specifies configuration of all PMCHs of an MBSFN area. The information provided for an individual PMCH includes the configuration parameters of the sessions that are carried by the concerned PMCH.

PMCH-InfoList information element

-- ASN1START

| | |
  |---|---|
  | PMCH-InfoList-r9 ::= | SEQUENCE (SIZE (0..maxPMCH-PerMBSFN)) OF PMCH-Info-r9 |
  | PMCH-InfoListExt-r12 ::= | SEQUENCE (SIZE (0..maxPMCH-PerMBSFN)) OF PMCH-InfoExt-r12 |
  | PMCH-Info-r9 ::= | SEQUENCE { |
  |     pmch-Config-r9 |     PMCH-Config-r9, |
  |     mbms-SessionInfoList-r9 | MBMS-SessionInfoIt-r9, |
  |     ... | |
  | } | |
  | ... | |
  | MBMS-SessionInfoList-r9 ::= | SEQUENCE (SIZE (0..maxSessionPerPMCH)) OF MBMS-SessionInfo-r9 |
  | MBMS-SessionInfo-r9 ::= | SEQUENCE { |
  |     tmgi-r9 |     TMGI-r9, |
  |     sessionId-r9 |     OCTET STRING (SIZE (1)) OPTIONAL,   -- Need OR |
  |     logicalChannelIdentity-r9 |     INTEGER (0..maxSessionIPMCH-1), |
  |     ... | |
  | } | |

| DECIMAL | HEX | MEANING |
|---|---|---|
| 0-999 | 0000-03E7 | TO BE ALLOCATED BY GSMA (SEE GSMA AD.26 [25]). IF A MESSAGE IDENTIFIER FROM THIS RANGE IS IN THE "SEARCH LIST", THE ME SHALL ATTEMPT TO RECEIVE SUCH CBS MESSAGE. THIS VERSION OF THIS DOCUMENT DOES NOT PROHIBIT NETWORKS FROM USING MESSAGE IDENTIFIERS IN THE RANGE 0000 - 03E7 (HEX) FOR CELL BROADCAST DATA DOWNLOAD TO THE SIM. |
| ⁰⁰⁰ | ⁰⁰⁰ | ⁰⁰⁰ |
| XXXX | | IF RECEIVED INDICATES THAT THE PUBLIC WARNING SYSTEM MESSAGE CONTAINS BINARY DATA THAT DESCRIBES AN MBMS CHANNEL CONTAINS MORE INFORMATION. |
| ⁰⁰⁰ | ⁰⁰⁰ | ⁰⁰⁰ |
| 65535 | FFFF | RESERVED, AND SHOULD NOT BE USED FOR NEW SERVICES, AS THIS VALUE IS USED ON THE SIM TO INDICATE THAT NO MESSAGE IDENTIFIER IS STORED IN THOSE TWO OCTETS OF THE SIM. IF THIS MESSAGE IDENTIFIER IS IN THE "SEARCH LIST", THE ME SHALL ATTEMPT TO RECEIVE THIS CBS MESSAGE. NOT SETTABLE BY MMI. |

GENERALLY, THE MMI FOR ENTERING ANY MESSAGE IN THE ME IS LEFT TO THE MANUFACTURERS' DISCRETION. HOWEVER, THE CODES ALLOWED TO BE SET BY MMI IN THE TABLE ABOVE SHALL BE CAPABLE OF BEING SPECIFIED VIA THEIR DECIMAL REPRESENTATION i.e.:

| OCTET 3 | OCTET 4 | |
|---|---|---|
| 0000 0000 | 0000 0000 | (DECIMAL '000'). |
| 0000 0000 | 0000 0001 | (DECIMAL '001'). |
| 0000 0000 | 0000 0010 | (DECIMAL '002'). |
| 0000 0000 | 0000 0011 | (DECIMAL '003'). |
| ⋮ | ⋮ | ⋮ |
| 0000 1111 | 1111 1111 | (DECIMAL '4095'). |
| ⋮ | ⋮ | ⋮ |
| 0001 0001 | 0000 0000 | (DECIMAL '4352'). |
| ⋮ | ⋮ | ⋮ |
| 0001 0001 | 0001 0001 | (DECIMAL '4369'). |
| ⋮ | ⋮ | ⋮ |
| 0001 0001 | 0001 0011 | (DECIMAL '4371'). |
| ⋮ | ⋮ | ⋮ |
| 0001 0001 | 0001 1110 | (DECIMAL '4382'). |
| ⋮ | ⋮ | ⋮ |
| 0001 0001 | 0010 0000 | (DECIMAL '4384'). |
| ⋮ | ⋮ | ⋮ |
| 1110 1111 | 1111 1111 | (DECIMAL '61439'). |

FIG. 8

RECEIVING PUBLIC WARNING SYSTEM DATA

TECHNICAL FIELD

This disclosure relates to data transmission in wireless communication systems and, more specifically, to receiving public warning system (PWS) data.

BACKGROUND

In some cases, Public Warning System (PWS) may be used to provide timely and accurate alerts, warnings, and information regarding disasters and other emergencies. In some cases, the PWS system may include a framework for regional emergency services such as the Korean Public Alert System (KPAS), European Warning System (EU-ALERT), Commercial Mobile Alert System (CMAS), and Earthquake and Tsunami Warning System (ETWS).

DESCRIPTION OF DRAWINGS

FIG. 6, constituted by FIGS. 6A and 6B, shows an example MBSFNAreaConfiguration message.

FIG. 7 shows an example specification for a message identifier indicating that the PWS message is a type 2 PWS message.

Like reference numbers and designations in the various drawings indicate like elements.

DETAILED DESCRIPTION

The present disclosure is directed to receiving public warning system (PWS) data. In some cases, a user equipment (UE) may receive type 1 PWS data. The type 1 PWS data may be processed by the UE and presented (e.g. displayed) as a human-readable alphanumeric alert message in a plain text format. In some cases, the PWS data may be delivered using a type 1 PWS data delivery mechanism. In a type 1 PWS data delivery mechanism, the PWS data is encapsulated in a PWS message. A PWS message may be referred to as a PWS warning notification message, a PWS warning message, or a warning message. A user equipment (UE) may monitor a known logical control channel on the radio interface and receives a PWS message on the known logical control channel. The UE may extract the PWS data from the PWS message. The UE may display the extracted PWS data at the UE for the user to see. In some cases, the PWS data may be unencrypted.

In some cases, the type 1 PWS data delivery mechanism may not be used to transmit type 2 PWS data. The type 2 PWS data may include data content that includes richer features than the type 1 PWS data. Examples of type 2 PWS data may include image data, video data, map data, audio data, and vehicle control data and other types of data. Due to inclusion of richer features or content the type 2 PWS data may have a larger data size than the type 1 PWS data. Because the payload size of the PWS message may be limited, the type 2 PWS data may be too big to fit in the PWS message. In addition, the control channel that carries the PWS message may not support high data rate, and therefore transmission of the type 2 PWS data in the PWS message may take too much time, use too much bandwidth of the control channel or otherwise be inefficient.

In some cases, the type 2 PWS data may be delivered to the UE using a type 2 PWS data delivery mechanism. In a type 2 PWS data delivery mechanism, the PWS data may be delivered outside of the PWS message. Examples of the type 2 PWS data delivery mechanism includes transmitting the PWS data on a Multimedia Broadcast Multicast Service (MBMS) channel, transmitting the PWS data using a unicast message, or transmitting the PWS data using a broadcast message that is different than the PWS message. The broadcast message may be transmitted using TV, Worldwide Interoperability for Microwave Access (WiMaX), Wi-Fi, satellite, or other broadcast-type channels not typically employed for PWS.

Figure 8:
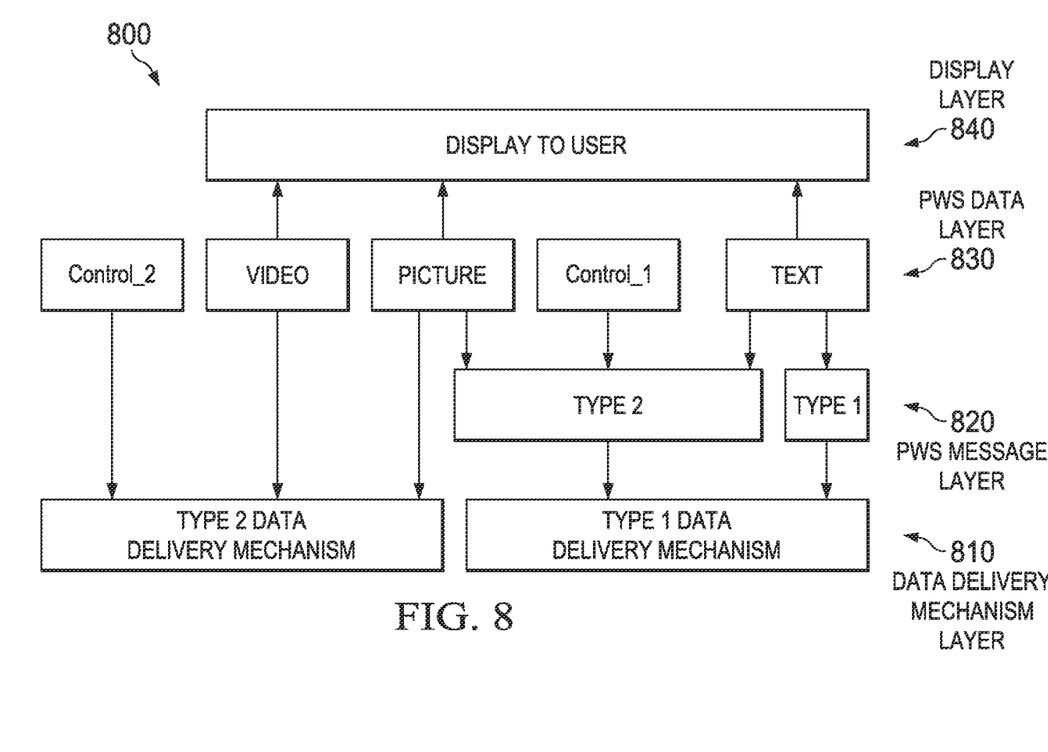
FIG. 8 is a block diagram illustrating example PWS layers.

In some cases, a different type of PWS message may be used for the type 2 PWS data delivery mechanism. For example, two types of PWS messages may be used. A type 1 PWS message may include the PWS message that is used in association with the type 1 PWS data delivery mechanism, while a type 2 PWS message may be used in association with the type 2 PWS data delivery mechanism. In some cases, the type 2 PWS message may not carry PWS data, and therefore may not be displayed to the user at the UE. Instead, the type 2 PWS message may carry control information for PWS services that may instruct or indicate to the UE at least one of how and where to receive the PWS data. For example, the PWS data may be transmitted using a Multimedia Broadcast Multicast Service (MBMS) channel, and the type 2 PWS message may be used to provide information related to the MBMS channel. In some cases, the type 1 and the type 2 PWS message may use the same message structure, and therefore the backward compatibility is maintained. FIG. 8 and associated descriptions provide additional details of PWS data, PWS messages, and PWS data delivery mechanisms.

Figure 1:
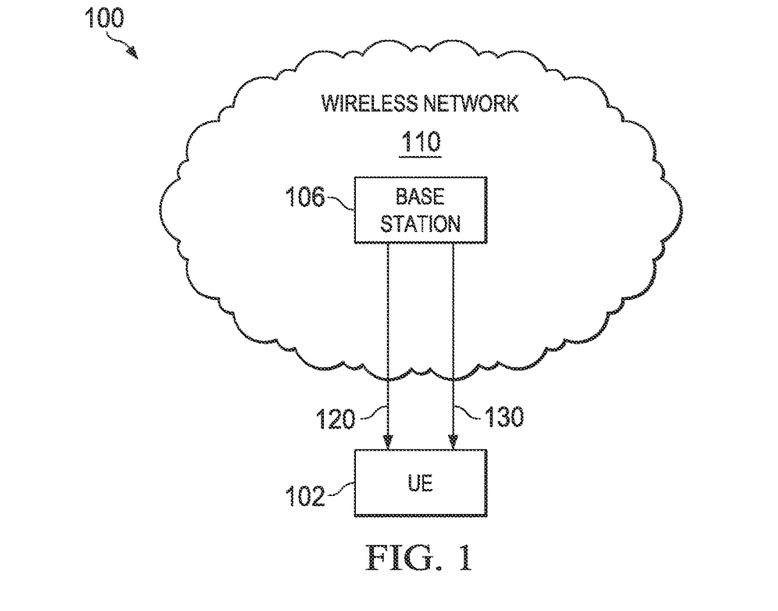
FIG. 1 is an example wireless communication system that receives Public Warning System (PWS) data.

FIG. 1 is an example wireless communication system 100 that receives PWS data. In some cases, a UE may receive a PWS message. The UE may determine that the PWS message is a type 2 PWS message. In some cases, the PWS message may include a message identifier in a specific portion (e.g. the header) of the PWS message, and the message identifier indicates that the PWS message is a type 2 PWS message. In some cases, the PWS message may include a payload identifier, and the payload identifier indicates that the PWS message is a type 2 PWS message. In some cases, in response to determining that the PWS message is a type 2 PWS message, the UE may refrain from displaying information regarding or carried by the PWS message.

The type 2 PWS message may indicate that the PWS data is delivered using a type 2 PWS data delivery mechanism. In some cases, the type 2 PWS message may include configuration information of the transport channel that is used to deliver the PWS data. For example, the type 2 PWS message may include configuration information of the MBMS channel that is used to transmit the PWS data. In some cases, the configuration information of the transport channel that is used to deliver the PWS data may be transmitted on a multicast control channel (MCCH), and the UE may monitor the MCCH to receive configuration information. The UE may receive the PWS data using the type 2 PWS data delivery mechanism. In some cases, the PWS data may include the type 2 PWS data.

In some cases, the PWS message may include information to facilitate decryption of the PWS data (e.g. a decryption key). For example, the UE may determine the decryption key based on the decryption information in the PWS message. The UE may use the decryption key to decrypt the received type 2 PWS data.

Delivering public warning system (PWS) data according to the methods and systems described herein may enable PWS data with rich content that may be delivered using a PWS delivery mechanism that supports higher data rate. In addition, using an MBMS or other broadcast/unicast channel to deliver the PWS data may enable efficient use of existing PWS and MBMS systems. Furthermore, the type 2 PWS message may use the same message structure as the type 1 PWS message. Therefore, the backward compatibility may be maintained and the impact to existing network and operations of legacy UE may be limited. Moreover, the PWS data may be transmitted using encryption algorithms that enhance the security of the system.

At a high level, the example wireless communication system 100 includes a wireless communication network 110, which includes a base station 106. The example wireless communication system 100 also includes a UE 102. In operation, the UE 102 receives a PWS message 120 from the base station 106. The UE 102 determines that the PWS message 120 is a type 2 PWS message rather than a legacy/convention type 1 PWS message carrying data that is to be processed and presented as human-readable text. The type 2 PWS message indicates that PWS data 130 is delivered using a type 2 PWS data delivery mechanism. As shown in FIG. 1, The PWS data 130 is transmitted outside of the PWS message 120 but may have been received in the PWS message 120 if that PWS message was a type 1 PWS message. The UE receives the PWS data 130 using the type 2 PWS data delivery mechanism. FIGS. 2-8 and associated descriptions provide additional details for these implementations.

Turning to a general description of the elements, a UE may be referred to but is not limited to as a mobile electronic device, user device, mobile station, subscriber station, portable electronic device, mobile communications device, wireless modem, push-to-talk (PTT) dispatch console, or wireless terminal. Examples of a UE (e.g., the UE 102) may include but are not limited to a cellular phone, personal data assistant (PDA), smart phone, PTT dispatch console, laptop, tablet personal computer (PC), pager, portable computer, portable gaming device, wearable electronic device, test equipment, gambling machine, car/vehicle, notice board, home appliance or other mobile communications device having components for communicating voice or data via a wireless communication network. The wireless communication network may include a wireless link over at least one of a licensed spectrum and an unlicensed spectrum.

Other examples of a UE include mobile and fixed electronic devices. A UE may include a Mobile Equipment (ME) device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. The term "UE" can also refer to any hardware or software component that can terminate a communication session for a user. In addition, the terms "user equipment," "UE," "user equipment device," "user agent," "UA," "user device," and "mobile device" can be used synonymously herein.

The wireless communication network 110 may include one or a plurality of radio access networks (RANs), other access networks such as fixed Ethernet or IEEE 802.11 WLAN, core networks (CNs), and external networks. The RANs may comprise one or more radio access technologies. In some implementations, the radio access technologies may be but are not limited to Global System for Mobile communication (GSM), Interim Standard 95 (IS-95), Universal Mobile Telecommunications System (UMTS), CDMA2000 (Code Division Multiple Access), Evolved Universal Mobile Telecommunications System (UMTS), Long Term Evaluation (LTE), or LTE-Advanced. In some instances, the core networks may be evolved packet cores (EPCs).

A RAN is part of a wireless telecommunication system which implements a radio access technology, such as UMTS, CDMA2000, 3GPP LTE, and 3GPP LTE-A. In many applications, a RAN includes at least one base station. A base station (e.g., the base station 106) may be a radio base station that may control all or at least some radio-related functions in a fixed part of the system. The base station may provide radio interface within their coverage area or a cell for a UE to communicate. The base station or plurality of base stations may constitute the cellular network to provide a wide area of coverage. The base station directly communicates with one or a plurality of UEs, other base stations, and one or more core network nodes.

While elements of FIG. 1 are shown as including various component parts, portions, or modules that implement the various features and functionality, nevertheless these elements may instead include a number of sub-modules, third-party services, components, libraries, and such, as appropriate. Furthermore, the features and functionality of various components can be combined into fewer components as appropriate.

Figure 2:
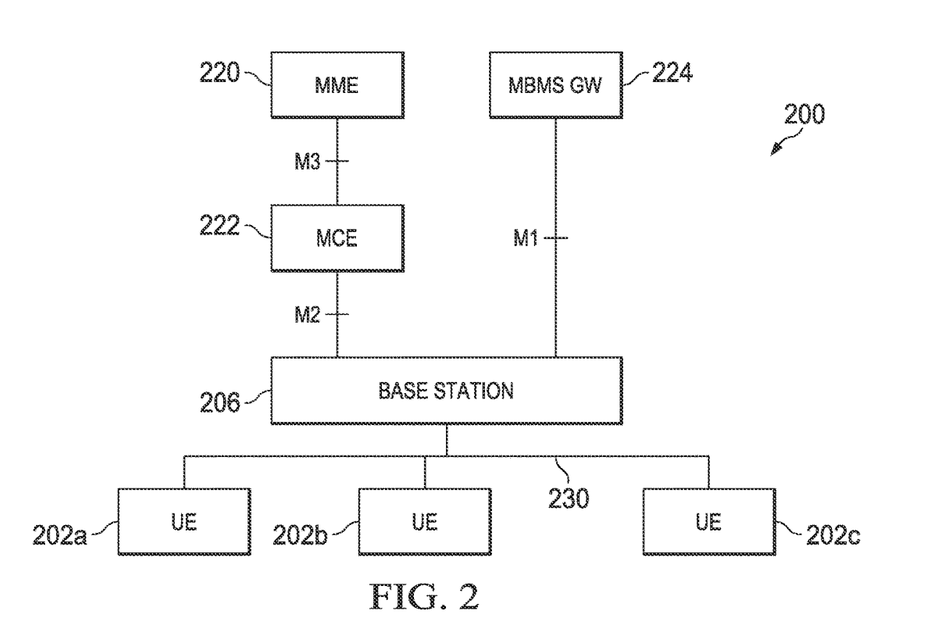
FIG. 2 is an example wireless communication system that uses a Multimedia Broadcast Multicast Service (MBMS) channel to transmit PWS data.

FIG. 2 is an example wireless communication system 200 that uses an MBMS channel to transmit PWS data using an EPC network. However an MBMS channel may be provided by other networks using different architecture. The example wireless communication system 200 includes an MBMS gateway (GW) 224 that is communicatively coupled with a base station 206 over an M1 interface. The example wireless communication system 200 also includes a Mobility Management Entity (MME) 220 that is communicatively coupled with a Multi-Cell/Multicast Coordination Entity (MCE) 222 over an M3 interface. The MCE 222 is communicatively coupled with the base station 206 over an M2 interface.

The MBMS GW 224 represents an application, set of applications, software, software modules, hardware, or combination thereof that can be configured to send MBMS packets to the base station 206. In some cases, the MBMS GW 224 may use Internet Protocol (IP) Multicast as the means of forwarding MBMS packets to the base station 206 over the M1 interface. The M1 interface may be a pure user plane interface, and no Control Plane Application Part is defined for this interface. In some cases, the MBMS GW 224 may perform MBMS session control functionalities, e.g., session start, session update, or session stop, via the MME 220.

The MME 220 represents an application, set of applications, software, software modules, hardware, or combination thereof that can be configured to transmit MBMS session control signaling to the MCE 222 over the M3 interface. The M3 interface may be a control plane interface. In some cases, an Application Part is defined for this interface. The application part may be used to transmit MBMS Session Control Signaling on an enhanced radio bearer (E-RAB) level. The MBMS Session Control Signaling may be transmitted without radio configuration data. In some cases, Stream Control Transmission Protocol (SCTP) may be used as a signaling transport over the M3 interface to provide Point-to-Point signaling.

The MCE 222 represents an application, set of applications, software, software modules, hardware, or combination thereof that can be configured to provide admission control functions for MBMS transmissions. In some cases, the MCE 222 may provide admission control functions in a Multicast-broadcast single-frequency network (MBSFN) area for multi-cell MBMS transmissions. The MCE 222 may also allocate the radio resources, e.g., time/frequency resources, used by the base station 206 for MBMS transmissions. In some cases, the MCE 222 may provide one or more following functions: counting and acquisition of counting results for the MBMS service; resumption of MBMS session(s) within MBSFN area(s); suspension of MBMS session(s) within MBSFN area(s).

In some cases, e.g., in a distributed MCE architecture, the MCE 222 may manage the above functions for a single base station of an MBSFN. In some cases, multiple MCEs may coordinate functions based on operations, administration and management (OAM) system.

The M2 interface is a control plane interface. In some cases, an Application Part may be defined for this interface to convey radio configuration data for the multi-cell transmission mode base stations. In some cases, Stream Control Transmission Protocol (SCTP) may be used as a signaling transport over the M2 interface to provide Point-to-Point signaling The example wireless communication system 200 also includes the UEs 202a, 202b and 202c. In some cases, the base station 206 transmits PWS data to one or more of the UEs 202a-c over an MBMS channel 230. In some cases, the PWS data may be type 2 PWS data.

In some cases, the MBMS channel 230 may include an MCCH, a Multicast Traffic Channel (MTCH), or a combination thereof. In some cases, the UE may receive configuration information of MBMS transmission within an MBSFN area by monitoring MCCH. The MCCH is a point-to-multipoint downlink channel used for transmitting MBMS scheduling and control information from the network to the UE for one or several MTCHs. In some cases, the MCCH includes the list of MBMS service information available in the MBSFN. The MCCH may change periodically. Each MCCH period may be referred to as an MCCH modification period. If there are changes in the MCCH in the next modification period, MCCH change notifications may be sent periodically in the current MCCH modification period.

Figure 6A:
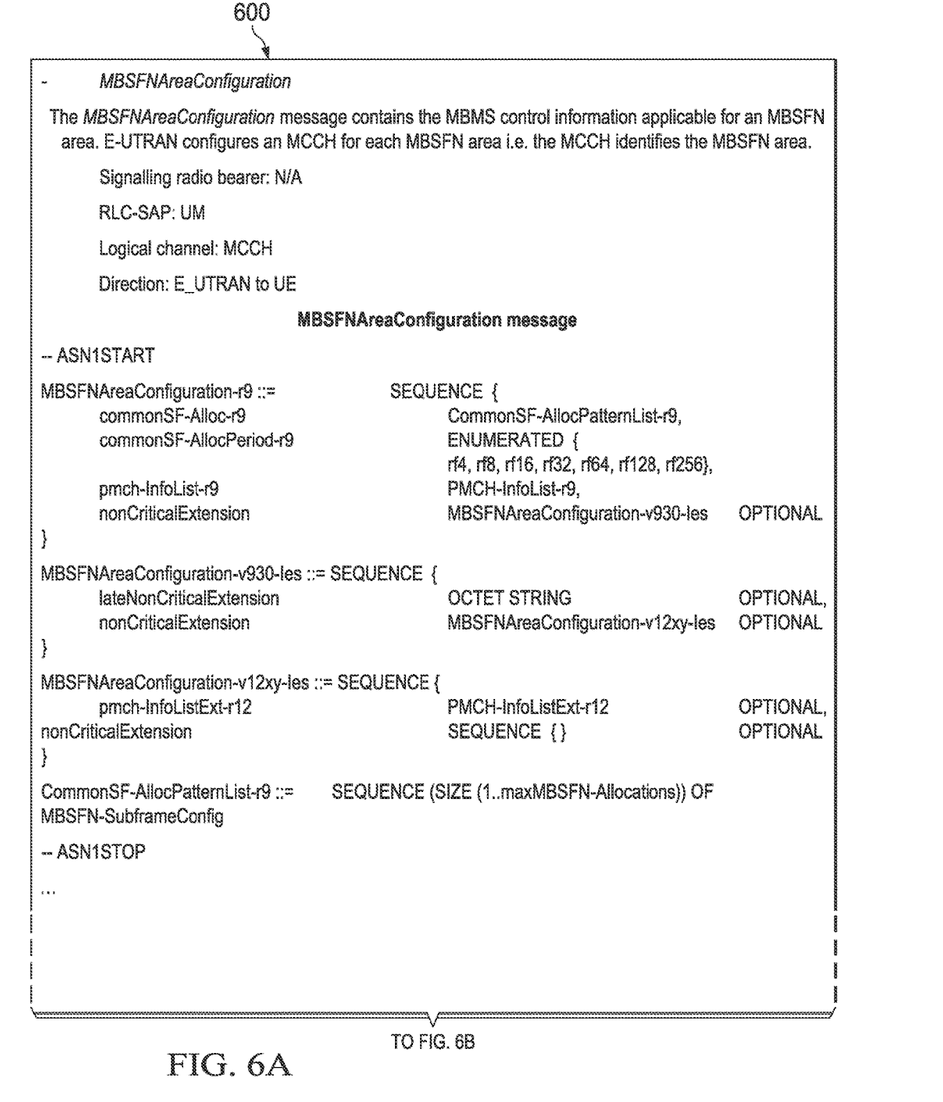
Figure 6B:
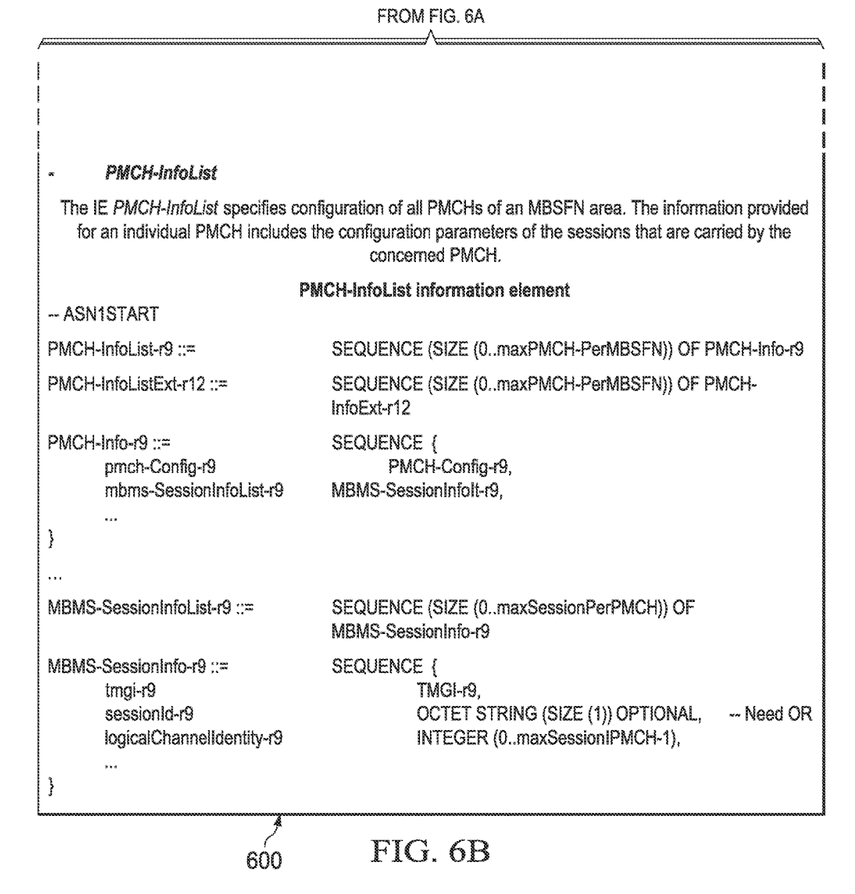

In some cases, a UE (e.g., one or more of the UEs 202a-c) may determine that a received PWS message is a type 2 PWS message. In response to the determining, the UE may monitor the MCCH to determine the MBMS configuration information that is associated with the PWS data. In some cases, the base station 206 may transmit the MBMS configuration information associated with the PWS data in a predetermined time period after the transmission of the type 2 PWS message. In some cases, the predetermined time period may be the next n-th subframe, the next n-th slot, or the next n-th radio frame after the type 2 PWS message. The UE may receive an MBMS configuration message that includes the MBMS configuration information over the MCCH. In some cases, the MBMS configuration message may be an MB SFNAreaConfiguration message. FIG. 6 shows an example MB SFNAreaConfiguration message 600.

Figure 3:
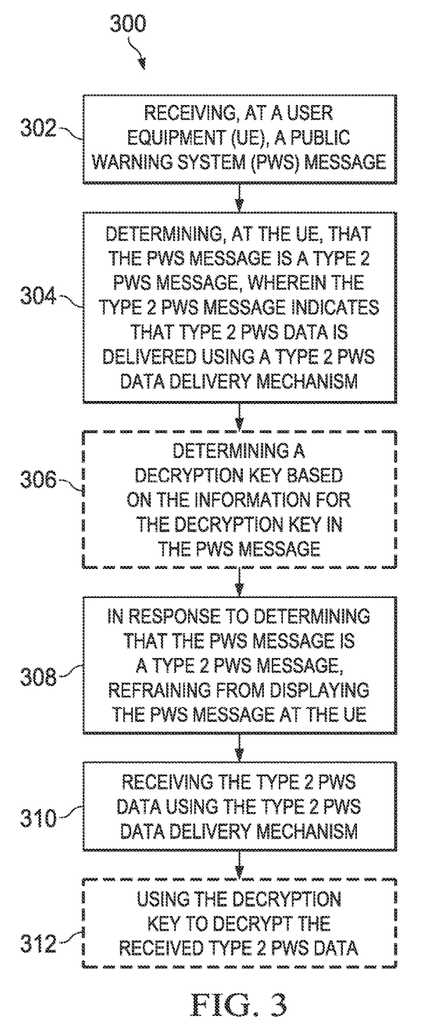
FIG. 3 is a flowchart illustrating an example method for receiving PWS data.

In some cases, the UE may receive MBMS configuration information in the type 2 PWS message. FIG. 3 and associated descriptions provide additional details of these implementations.

FIG. 3 is a flowchart illustrating an example method 300 for receiving PWS data. The method 300 may begin at block 302, a public warning system (PWS) message is received at a user equipment (UE). At block 304, the UE determines that the PWS message is a type 2 PWS message. The type 2 PWS message indicates that type 2 PWS data is delivered using a type 2 PWS data delivery mechanism. In some cases, the type 2 PWS data includes data that is different than alphanumeric data. For example, the type 2 PWS data may include image data, video data, map data, audio data, vehicle control data, or a combination thereof. Table 1 shows an example type 2 PWS message.

TABLE 1 example type 2 PWS message.

| Octet Number(s) | Field |
|---|---|
| 1-2 | Serial Number |
| 3-4 | Message Identifier |
| 5 | Data Coding Scheme |
| 6 | Page Parameter |
| 7 | Message Parameter |
| 8-11 | PWS + TAG |
| 12-88 | Content of Message (payload) |

In some cases, the type 2 PWS message uses the same message structure as the type 1 PWS message. For example, as shown in Table 1, the example type 2 PWS message may include a header and a payload. The header may include the first 11 bytes of the message, and the payload may include the remaining bytes in the message.

In some cases, e.g., when the total payload associated with one alert exceeds the size of the payload in one PWS message, the total payload may be transmitted in multiple PWS messages that are associated with one another. In some cases, the type 2 PWS message may include a "PWS+TAG" field in the header, the "PWS+TAG" may include the serial number and the message identifier of a PWS message that is associated with the PWS message. Therefore, the UE may combine the payloads of the associated PWS messages. In some cases, associated PWS messages may be transmitted in sequence or out of sequence. In some cases, the type 2 PWS message may include a message parameter field in the header. The message parameter field may indicate the sequence of the payload in associated PWS messages. For example, if a combined payload is delivered in 3 associated PWS messages, the message parameter field of these three associated PWS messages may be set to "0010 0000," "0010 0001," and "0010 0002," respectively.

In some cases, the type 2 PWS message may include a message identifier field in the header. In some cases, the message identifier may indicate that the PWS message is a type 2 PWS message. FIG. 7 shows an example specification 700 for a message identifier indicating that the PWS message is a type 2 PWS message. For example, a predetermined value may be used to indicate that the PWS message is a type 2 PWS message. If the UE determines that the message identifier field in the header of the received PWS message is set to the predetermined value, the UE may process the PWS message as a type 2 PWS message. If the UE determines that the message identifier field in the header of the received PWS message is not set to the predetermined value, the UE may process the PWS message as a type 1 PWS message. In some cases, the predetermined value may be specified in a telecommunication standard. Alternatively or in combination, the predetermined value may be broadcasted to the UE.

In some cases, the type 2 PWS message may include a payload identifier in the payload field. In some cases, the payload identifier may indicate that the PWS message is a type 2 PWS message. In some cases, the payload identifier may be the first byte in the payload field. Therefore, if the UE determines that the first byte in the payload field is the payload identifier, the UE may process the PWS message as a type 2 PWS message. Table 2 shows an example payload identifier.

TABLE 2

| | | | | | | |
|---|---|---|---|---|---|---|
| Reserved for extension | Reserved | Reserved | Reserved | Reserved | MBMS | text | Image descriptor | example payload identifier

As shown in Table 2, the payload identifier may include an image description bit. The image description bit may indicate whether the PWS data includes image data. For example, if the image description bit is set to '1,' the PWS data may include image data. In some cases, the image data may be included in the payload of the PWS message. If the image description bit is set to '0,' the PWS data may not include image data. The payload identifier may also include a text bit. If the text bit is set to '1,' the PWS data may include text data. In some cases, the text data may be included in the payload of the PWS message. If the text bit is set to '0,' the PWS data may not include text data. Although not shown in Table 2, in some cases, the payload identifier may include additional data type fields to indicate other types of PWS data, e.g., video data, map data, vehicle control data, audio data, etc.

The payload identifier may include an MBMS identifier bit. As discussed previously, in some cases, the PWS data may be delivered using an MBMS channel. In some cases, the MBMS identifier bit may be used to indicate whether MBMS configuration information associated with the MBMS channel is included in the PWS message. For example, if the MBMS identifier bit is set to '1,' then the UE may determine that MBMS configuration information associated with the MBMS channel is included in the PWS message. If the MBMS identifier bit is set to '0,' then the UE may determine that MBMS configuration information associated with the MBMS channel is not included in the PWS message.

In some cases, if the MBMS identifier bit is set to '1,' the UE may further determine whether an MBMS descriptor follows the payload identifier. Table 3 shows an example MBMS descriptor. However the descriptor configuration shown in Table 3 could be applied to other bit (e.g. text and image descriptor shown in Table 2), whereby the tag identifies the type of data to follow, followed by length and then the data itself.

TABLE 3 example MBMS descriptor.

Tag
Length
MBMS control information Payload

As shown in the Table 3, the MBMS descriptor may include a tag field. The tag field may be set to a predetermined value that indicates the MBMS descriptor. The MBMS descriptor may optionally include a length field. The length field may include the number of the bytes of the MBMS control information payload.

The MBMS descriptor may include an MBMS control information payload field. The MBMS control information payload field may include the MBMS configuration information for the MBMS channel that delivers the PWS data. Table 4 shows a first example MBMS control information payload field.

TABLE 4 a first example MBMS control information payload

| Name | Optional or mandatory | Use |
|---|---|---|
| PLMN information | Optional | Identifies the PLMN that MBMS data is being broadcast over |
| Frequency(ies)/ Cell(s) | Optional | Identifies the frequency(ies)/cell(s) that the UE tunes to find the e.g. BCCH that has SIB which indicates where to find MBMS information. |
| TMGI | Conditional, if IP Multicast address is not received this is Mandatory | Identifies the bearer service that the UE is interested in for the PWS data. |
| Flow Identifier | | Location dependent subflow of the MBMS bearer service. When present, the Flow Identifier together with the TMGI uniquely identify the MBMS Bearer Context. |
| IP Multicast address(es) | Conditional, if IP TMGI is not received this is Mandatory | |
| Start time | Optional | Identifies the start time that the data will be available from |
| Stop time | Optional | Identifies the stop time that the data will not be available from |
| Decryption key/ Indicator | Optional | A key or pointer to a key that can be used by the UE to decrypt the data being broadcast in the MBMS MTCH. |

As shown in Table 4, the MBMS control information payload field may include at least one of a Temporary Mobile Group Identity (TMGI) or an Internet Protocol (IP) Multicast address. The TMGI or the IP multicast address may indicate the bearer service for the PWS data. The MBMS control information payload field may also include a flow identifier that indicates the location dependent subflow of the MBMS bearer service for the PWS data. In some cases, the MBMS control information payload field may include a network identifier e.g. public land mobile network (PLMN) information field. The PLMN information field may identify the network e.g., PLMN, over which the MBMS channel for the PWS data is transmitted. The MBMS control information payload field may also include a frequency identifier or a cell identifier. The frequency identifier or the cell identifier may indicate the frequency (or frequencies) or the cell (or cells) that the UE may monitor for additional MBMS information. In some cases, the MBMS control information payload field may include start and stop time, which indicates the start time and the stop time that the data will be available.

At block 306, the UE optionally determines a decryption key based on the information for the decryption key in the PWS message. In some cases, the PWS data delivered using the type 2 PWS data delivery mechanism may be encrypted. In these or other cases, the MBMS control information payload field may include a decryption key field. In some cases, the decryption key field may include a decryption key. Alternatively or in combination, the decryption key field may include a decryption key indicator. The decryption key indicator may be a pointer, reference or link to obtain the decryption key. For example, the decryption key may be an index for the decryption key in a key database stored in the Mobile equipment or application on the UICC e.g. USIM. An authorized UE may retrieve the decryption key using the key indicator from the key database. Transmitting decryption key indicator instead of the decryption key may provide additional security. For example, an authorized UE that does not have access to the key database may not be able to determine the decryption key based on the key indicator.

In some cases, the MBMS control information payload field may include an MCCH information field. The MCCH information field may include an MBMS configuration message, e.g., the MBSFNAreaConfiguration message discussed previously, that includes the MBMS configuration information associated with the MBMS channel transmitting the PWS data. Table 5 shows a second example MBMS control information payload that includes the MCCH information field.

TABLE 5 a second example MBMS control information payload

| | Optional or mandatory | |
|---|---|---|
| PLMN information | Optional or mandatory | Identifies the PLMN that MBMS data is being broadcast over |
| Frequency(ies)/ Cell | Optional | Identifies the frequency(ies)/cell(s) that the UE tunes to find the e.g. BCCH that has SIB which indicates where to find MBMS information. |
| Start time | Optional | Identifies the start time that the data will be available from |
| Stop time | Optional | Identifies the stop time that the data will not be available from |
| Decryption key/ Indicator | Optional | A key or pointer to a key that can be used by the UE to decrypt the data being broadcast in the MBMS MTCH. |

TABLE 5-continued a second example MBMS control information payload

| PLMN information | Optional or mandatory | Identifies the PLMN that MBMS data is being broadcast over |
|---|---|---|
| MCCH Information | Mandatory | includes the "MBSFNAreaConfiguration message" |

Referring to FIG. 3, at block 308, in response to determining that the PWS message is a type 2 PWS message, the UE may refrain from displaying information regarding or carried by the PWS message. In some cases, if the PWS message is a type 2 PWS message, the PWS message does not include PWS data. Therefore, the UE may not display the payload of the PWS message. In some cases, the type 2 PWS message may include PWS data. In these cases, in response to determining that the PWS message is a type 2 PWS message, the UE may determine whether PWS data is included in the PWS message. The UE may determine whether PWS data is included in the PWS message based on the payload identifier discussed in Table 2. If the payload identifier indicates that the PWS message include text data, picture data, or other data, the UE may display the PWS message, e.g., on a screen of the UE. If the payload identifier does not indicate that the PWS message include PWS data, the UE may refrain from displaying the PWS message. If the type 2 PWS message contained Decryption key/Indicator and the UE does not support the Decryption key/Indicator then the UE may not perform block 312

At block 310, the UE uses information in the type 2 PWS message to receive the type 2 PWS data via the type 2 PWS data delivery mechanism. In some cases, the type 2 PWS data delivery mechanism delivers the type 2 PWS data using an MBMS channel, and the UE receives the type 2 PWS data over the MBMS channel. Following is an example procedure for the UE to receive the type 2 PWS data over the MBMS channel.

The UE may not retrieve the MBMS information described if the UE received a start time and the start time has not yet passed; or if the UE received an end time and the end time (as shown in Table 4 and Table 5 has passed. The UE may retrieve MBMS information if the UE received a start time and the start time has passed; or if the UE received an end time and the end time has not yet passed.

The UE may perform MBMS acquisition procedure to acquire the MBMS channel that will be configured or otherwise used to transmit the PWS data. Following is an example specification of the MBMS acquisition procedure.

If the MS supports type 2 PWS message and a) Receives an indication that MBMS is being used to provide PWS services; and b) If the "Frequency/Cell information" or "PLMN information" was received in the type 2 PWS message then before performing PLMN selection as specified in 3GPP TS 23.122 (section 3.1×PLMN selection triggered by MBMS PWS communications), the UE may check whether there is a PLMN on "Frequency/Cell information" if received or the PLMN(s) received in the "PLMN information" are available. If no cell (PLMN) was found, then the procedure may be stopped; otherwise, if one or more PLMNs operate in the "Frequency/Cell information" (if received) or PLMNs are available if the "Frequency/Cell information" was not received and the following conditions are met:

a) none of the PLMNs reported found are the registered PLMN or equivalent to the registered PLMN; and b) at least one of the PLMNs found provides MBMS services;

then the UE may:

1) if in EMM-IDLE mode, perform PLMN selection limiting the PLMN search to the PLMNs in the "PLMN information" if received; or 2) else if in EMM-CONNECTED mode, either:

i) perform a detach procedure as specified in 3GPP TS 24.301 [11] and then perform PLMN selection limiting the PLMN search to the PLMNs in the "PLMN information" if received; or ii) otherwise the UE may perform cell reselection to that Frequency/Cell.

The following is an example specification in TS 23.122 for PLMN selection triggered by MBMS PWS communication:

If the MS supports type 2 PWS messaging and a) Receives an indication that MBMS is being used to provide PWS services; and b) needs to perform a PLMN selection for MBMS PWS communications as specified in UNKNOWN specification then the MS may proceed as follows:

i) the MS may store a duplicate value of the RPLMN and a duplicate of the PLMN selection mode that were in use before PLMN selection due to MBMS PWS communications was initiated;

ii) the MS may enter into Automatic mode of PLMN selection as specified in subclause 4.4 taking into account the additional requirements in items iii) to x) below;

iii) If the "Frequency/Cell information" information element as specified in the UNKNOWN specification is received by the UE, among the PLMNs advertised by the E-UTRA cell operating in the radio resources received by the MS in the PWS enhanced message "Frequency/Cell information" information element as specified in the UNKNOWN specification, the MS may choose one PLMN which:

1) provides MBMS for PWS; and 2) is neither in the list of "forbidden PLMNs" nor in the list of "forbidden PLMNs for EPS services" as specified in 3GPP TS 24.301 [23A] and the PLMN is not in the list of "PLMNs with E-UTRAN not allowed" as specified in subclause 3.1;

if conditions 1) through 2) above are met then the MS may attempt to register on that PLMN. If none of the PLMNs meet conditions 1) through 2) above, the MS may return to the stored duplicate PLMN selection mode and use the stored duplicate value of RPLMN for further action;

iv) if the registration fails due to "PLMN not allowed" or "EPS services not allowed", then the MS may update the appropriate list of forbidden PLMNs as specified in subclause 3.1, and may either:

A) if the PLMN provides MBMS services, perform MBMS listening on the selected PLMN in limited service state. In this case the MS may not search for available and allowable PLMNs during the duration of MBMS data acquisition;

B) return to the stored duplicate PLMN selection mode and use the stored duplicate value of RPLMN for further action; or C) perform the action described in iii) again with the choice of PLMNs further excluding the PLMNs on which the MS has failed to register.

Whether the MS performs A), B) or C) above is left up to MS implementation.

v) if the registration fails due to causes other than "PLMN not allowed" or "EPS services not allowed", the MS may:

if the handling of the failure requires updating a list of forbidden PLMNs, update the appropriate list (as specified in 3GPP TS 24.301 [23A]); and if the handling of the failure does not require updating a list of forbidden PLMNs (as specified in 3GPP TS 24.301 [23A]), remember the PLMN as a PLMN on which the MS has failed to register;

NOTE 1: How long the MS memorizes the PLMNs on which it has failed to register is implementation dependent.

And the MS may either:

1) A1) return to the stored duplicate PLMN selection mode and use the stored duplicate value of RPLMN for further action;

2) B1) perform the action described in iii) again with the choice of PLMNs further excluding the PLMNs on which the MS has failed to register; or 3) C1) If the "Frequency/Cell information" information element as specified in the UNKNOWN specification is received by the UE, acquire MBMS PWS data in limited service state on a PLMN advertised by the cell operating in the "Frequency/Cell information" information element as specified in the UNKNOWN specification, if registration on this PLMN has previously failed due to "PLMN not allowed" or "EPS services not allowed" and if this PLMN provides MBMS PWS data. In this case the MS may not search for available and allowable PLMNs during the duration time of acquiring the MBMS PWS data;

Whether the MS performs A1), B1) or C1) above is left up to MS implementation.

vi) if the MS is no longer in the coverage of the selected PLMN, then the MS may return to the stored duplicate PLMN selection mode and use the stored duplicate value of RPLMN for further action.

vii) if the MS is unable to find a suitable cell on the selected PLMN, then the MS may either:

4) A3) if the PLMN provides MBMS PWS data, acquire MBMS PWS data on the selected PLMN in limited service state. In this case the MS may not search for available and allowable PLMNs during the duration of acquiring the MBMS PWS data; or 5) B3) return to the stored duplicate PLMN selection mode and use the stored duplicate value of RPLMN for further action.

Whether the MS performs A3) or B3) above is left up to MS implementation.

viii) if the MS is switched off while on the selected PLMN and switched on again, the MS may use the stored duplicate value of RPLMN as RPLMN and behave as specified in subclause 4.4.3.1;

ix) if the user initiates a PLMN selection while on the selected cell, the MS may delete the stored duplicate value of PLMN selection mode, use the stored duplicate value of RPLMN as RPLMN and follow the procedures (as specified for switch-on or recovery from lack of coverage) in subclause 4.4.3.1. The MS may delete the stored duplicate value of RPLMN once the MS has successfully registered to the selected PLMN: and x) if the MS no longer needs MBMS PWS data, the MS may return to the stored duplicate PLMN selection mode and use the stored duplicate value of RPLMN for further action.

NOTE 2: If the MS returns to the RPLMN due to a failure to register in the selected PLMN, the upper layers of the MS can trigger PLMN selection again to initiate MBMS PWS communications.

If the PLMN selected for MBMS PWS communications is a VPLMN, the MS may not periodically scan for higher priority PLMNs during the duration of aquiring MBMS PWS data.

The solution to prevent potential ping-pong between the RPLMN and the PLMN selected for MBMS PWS data communication is MS implementation specific.

At block 312, if based on block 306 the UE receives Decryption key/Indicator and the UE supports the Decryption key/Indicator then the UE uses the decryption key to decrypt the received type 2 PWS data.

Figure 4:
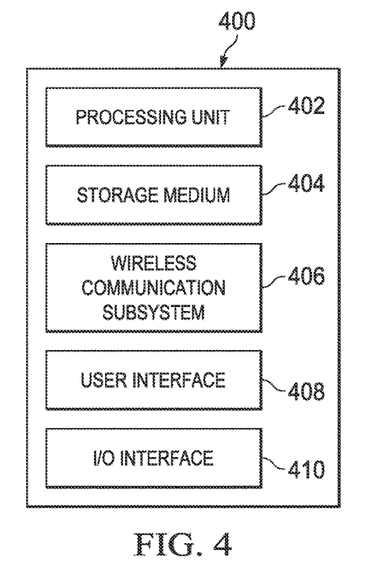
FIG. 4 is a schematic block diagram illustrating an example user equipment device.

FIG. 4 is a schematic block diagram illustrating an example user equipment device 400. The illustrated device 400 includes a processing unit 402, a computer-readable storage medium 404 (for example, ROM or flash memory), a wireless communication subsystem 406, a user interface 408, and an I/O interface 410.

The processing unit 402 can include one or more processing components (alternatively referred to as "processors" or "central processing units" (CPUs)) configured to execute instructions related to one or more of the processes, steps, or actions described above in connection with one or more of the implementations disclosed herein. In some implementations, the processing unit 402 may be configured to generate control information, such as a measurement report, or respond to received information, such as control information from a network node. The processing unit 402 may also be configured to make an Radio Resource Management (RRM) decision such as cell selection/reselection information or triggering a measurement report. The processing unit 402 can also include other auxiliary components, such as random access memory (RAM) and read only memory (ROM). The computer-readable storage medium 404 can be embodied by a non-transitory medium configured to store an operating system (OS) of the device 400 and various other computer-executable software programs for performing one or more of the processes, steps, or actions described above.

The wireless communication subsystem 406 may be configured to provide wireless communication for data and/or control information provided by the processing unit 402. The wireless communication subsystem 406 can include, for example, one or more antennas, a receiver, a transmitter, a local oscillator, a mixer, and a digital signal processing (DSP) unit. In some implementations, the subsystem 406 can support multiple input multiple output (MIMO) transmissions. In some implementations, the receivers in the wireless communication subsystems 406 can be an advance receiver or a baseline receiver. Two receivers can be implemented with identical, similar, or different receiver processing algorithms.

The user interface 408 can include, for example, one or more of a screen or touch screen (for example, a liquid crystal display (LCD), a light emitting display (LED), an organic light emitting display (OLED), a micro-electromechanical system (MEMS) display), a keyboard or keypad, a trackball, a speaker, and a microphone. The I/O interface 410 can include, for example, a universal serial bus (USB) interface. Various other components can also be included in the device 400.

Figure 5:
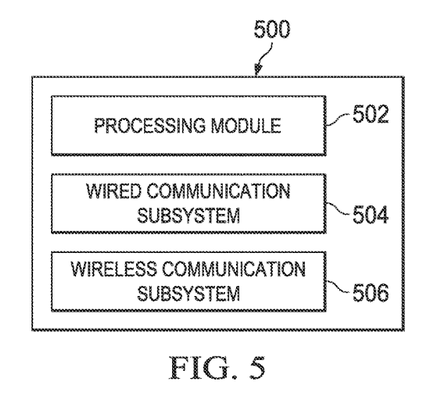
FIG. 5 is a schematic block diagram illustrating an example base station.

FIG. 5 is a schematic block diagram illustrating an example base station device 500. The illustrated device 500 includes a processing module 502, a wired communication subsystem 504, and a wireless communication subsystem 506. The wireless communication subsystem 506 can receive data traffic and control traffic from the UE. In some implementations, the wireless communication subsystem 506 may include a receiver and a transmitter. The wired communication subsystem 504 can be configured to transmit and receive control information between other access node devices via backhaul connections. The processing module 502 can include one or more processing components (alternatively referred to as "processors" or "central processing units" (CPUs)) capable of executing instructions related to one or more of the processes, steps, or actions described above in connection with one or more of the implementations disclosed herein. The processing module 502 can also include other auxiliary components, such as random access memory (RAM), read only memory (ROM), secondary storage (for example, a hard disk drive, flash memory or other non-transitory storage medium). In some implementations, the processing module 502 may be configured to generate control information or respond to received information such as a measurement report transmitted from a UE. The processing module 502 may also be configured to make an RRM decision based at least in part on the information transmitted from the UE, such as cell selection/reselection information or the measurement report. The processing module 502 can execute certain instructions and commands to provide wireless or wired communication, using the wired communication subsystem 504 or a wireless communication subsystem 506. Various other components can also be included in the device 500.

FIG. 8 is a block diagram 800 illustrating example PWS layers. The block diagram 800 includes a data delivery mechanism layer 810, a PWS message layer 820, a PWS data layer 830, and a display layer 840. The PWS data layer 830 includes data associated with PWS. The PWS data layer 830 may include text data, picture data, video data, or control information. Though not shown in FIG. 8, the PWS data layer 830 may also include audio data, map data, vehicle data, or any other types of data associated with PWS. In some cases, the data in the PWS data layer 830 may be grouped in different types. For example, type 1 PWS data includes the text data, and type 2 PWS data includes picture data, video data, include audio data, map data, vehicle data or any other data with rich content.

The block diagram 800 also includes the PWS message layer 820. The PWS message layer 820 includes type 1 PWS message and type 2 PWS message. As discussed previously, text data may be encapsulated in type 1 PWS message, while control information may be included in type 2 PWS message. In some cases, the control information may include a message identifier, a payload identifier, a network identifier, a frequency identifier, a cell identifier, MBMS information, decryption information, or a combination thereof. As discussed previously, in some cases, PWS data are not included in a type 2 PWS message, and therefore content of type 2 PWS message may not displayed. Alternatively, some PWS data, e.g., text data or picture data, may be included in a type 2 PWS message, and the UE may determine whether the type 2 PWS message includes PWS data based on an identifier in the type 2 PWS message.

The block diagram 800 also includes the PWS delivery mechanism layer 810. The PWS delivery mechanism layer 810 includes type 1 data delivery mechanism and type 2 data delivery mechanism. The type 1 data delivery mechanism delivers PWS message on a control channel associated with the PWS message. Therefore, the type 1 data delivery mechanism can be used to deliver type 1 or type 2 PWS messages. The type 1 data delivery mechanism may be used to deliver text data that are encapsulated in the PWS message. The type 2 data delivery mechanism delivers PWS data on outside of the PWS message. The type 1 data delivery mechanism may be used to deliver video data, picture data, or other data associated with PWS. In some cases, some control information, e.g., control_1 in FIG. 8, may be delivered in the type 2 PWS message. In some cases, some control information, e.g., control_2 in FIG. 8, may be delivered using type 2 data delivery mechanism.

The block diagram 800 also includes the display layer 840. The display layer 840 includes information that is displayed. In some cases, data content, e.g., video data, picture data, or text data, are displayed, and control information, e.g., control_1 or control_2 in FIG. 8, is not displayed.

While operations are depicted in the drawings in a particular order, this should not be understood as requiring that such operations be performed in the particular order shown or in sequential order, or that all illustrated operations be performed. In certain circumstances, multitasking and parallel processing may be employed. Moreover, the separation of various system components in the implementation described hereinshould not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made.

While the detailed description has shown, described, and pointed out the features of the disclosure as applied to various implementations, it will be understood that various omissions, substitutions, and changes in the form and details of the method and system illustrated may be made by those skilled in the art. In addition, the order of method steps are not implied by the order they appear in the claims.

The invention claimed is:

1. A method, comprising:
   receiving, at a user equipment (UE), a first public warning system (PWS) message;
   determining, at the UE, that the first PWS message is followed by a second PWS message, wherein the second PWS message includes PWS content data, the first PWS message indicates that the PWS content data in the second PWS message is delivered via a broadcast channel, and wherein the determining that the first PWS message is followed by the second PWS message comprises detecting that a message identifier in the first PWS message comprises a tag indicator indicating that the first PWS message is associated with the second PWS message;
   determining that the first PWS message includes a public land mobile network (PLMN) identifier;
   in response to determining that the first PWS message includes the PLMN identifier, selecting a PLMN based on the PLMN identifier in the first PWS message;
   receiving the PWS content data in the second PWS message using the broadcast channel in the selected PLMN;
   in response to determining that the first PWS message includes decryption information, decrypting the received PWS content data using the decryption information in the first PWS message; and
   in response to determining that the first PWS message is followed by the second PWS message and determining that the PWS content data is included in the second PWS message based on an identifier of the second PWS message:
   displaying the PWS content data in the second PWS message at the UE.

2. The method of claim 1, wherein the PWS content data is other than human-readable alphanumeric data.

3. The method of claim 1, wherein the broadcast channel is a Multimedia Broadcast Multicast Service (MBMS) channel.

4. The method of claim 3, wherein the first PWS message includes at least one of a Temporary Mobile Group Identity (TMGI), an Internet Protocol (IP) Multicast address, or a multicast control channel (MCCH) message, and the at least one of the TMGI, the IP Multicast address, or the MCCH message includes MBMS configuration information for the MBMS channel.

5. The method of claim 3, further comprising:
   in response to determining that the first PWS message is followed by the second PWS message, receiving a multicast control channel (MCCH), wherein the MCCH includes MBMS configuration information associated with the MBMS channel.

6. The method of claim 1, wherein the first PWS message further includes a payload identifier, and wherein the determining at the UE that the first PWS message is followed by the second PWS message further comprises detecting the payload identifier.

7. The method of claim 1, wherein decrypting the received PWS content data using the decryption information comprises:
   determining a decryption key based on the decryption information in the first PWS message; and
   using the decryption key to decrypt the received PWS content data.

8. A user equipment (UE), comprising:
   a memory; and
   at least one hardware processor communicatively coupled with the memory and configured to:
   receive, at the UE, a first public warning system (PWS) message;
   determine, at the UE, that the first PWS message is followed by a second PWS message, wherein the second PWS message includes PWS content data, the first PWS message indicates that the PWS content data in the second PWS message is delivered via a broadcast channel, and wherein the determining that the first PWS message is followed by the second PWS message comprises detecting that a message identifier in the first PWS message comprises a tag indicator indicating that the first PWS message is associated with the second PWS message;

determine that the first PWS message includes a public land mobile network (PLMN) identifier;

in response to determining that the first PWS message includes the PLMN identifier, select a PLMN based on the PLMN identifier in the first PWS message;

receive the PWS content data in the second PWS message using the broadcast channel in the selected PLMN;

in response to determining that the first PWS message includes decryption information, decrypt the received PWS content data using the decryption information in the first PWS message; and in response to determining that the first PWS message is followed by the second PWS message and determining that the PWS content data is included in the second PWS message based on an identifier of the second PWS message:

display the PWS content data in the second PWS message at the UE.

9. The UE of claim 8, wherein the PWS content data is other than human-readable alphanumeric data.

10. The UE of claim 8, wherein the broadcast channel is a Multimedia Broadcast Multicast Service (MBMS) channel.

11. The UE of claim 10, wherein the first PWS message includes at least one of a Temporary Mobile Group Identity (TMGI), an Internet Protocol (IP) Multicast address, or a multicast control channel (MCCH) message, and the at least one of the TMGI, the IP Multicast address, or the MCCH message includes MBMS configuration information for the MBMS channel.

12. The UE of claim 10, wherein the at least one hardware processor is further configured to:

in response to determining that the first PWS message is followed by the second PWS message, receive a multicast control channel (MCCH), wherein the MCCH includes MBMS configuration information associated with the MBMS channel.

13. The UE of claim 8, wherein the first PWS message further includes a payload identifier, and wherein the determining at the UE that the first PWS message is followed by the second PWS message further comprises detecting the payload identifier.

14. The UE of claim 8, wherein decrypting the received PWS content data using the decryption information comprises:

determining a decryption key based on the decryption information in the first PWS message; and using the decryption key to decrypt the received PWS content data.

15. A non-transitory computer-readable medium containing instructions which, when executed, cause a user equipment (UE) to perform operations comprising:

receiving, at the UE, a first public warning system (PWS) message;

determining, at the UE, that the first PWS message is followed by a second PWS message, wherein the second PWS message includes PWS content data, the first PWS message indicates that the PWS content data in the second PWS message is delivered via a broadcast channel, and wherein the determining that the first PWS message is followed by the second PWS message comprises detecting that a message identifier in the first PWS message comprises a tag indicator indicating that the first PWS message is associated with the second PWS message;

determining that the first PWS message includes a public land mobile network (PLMN) identifier;

in response to determining that the first PWS message includes the PLMN identifier, selecting a PLMN based on the PLMN identifier in the first PWS message;

receiving the PWS content data in the second PWS message using the broadcast channel in the selected PLMN;

in response to determining that the first PWS message includes decryption information, decrypting the received PWS content data using the decryption information in the first PWS message; and in response to determining that the first PWS message is followed by the second PWS message and determining that the PWS content data is included in the second PWS message based on an identifier of the second PWS message:

displaying the PWS content data in the second PWS message at the UE.

* * * * *